(12) United States Patent
Nauck et al.

(10) Patent No.: US 7,933,855 B2
(45) Date of Patent: Apr. 26, 2011

(54) MONITORING COMPUTER-CONTROLLED PROCESSES THROUGH A MONITORING SYSTEM

(75) Inventors: Detlef D Nauck, Suffolk (GB); Behnam Azvine, Suffolk (GB); Martin Spott, Suffolk (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 922 days.

(21) Appl. No.: 11/884,461

(22) PCT Filed: Feb. 27, 2006

(86) PCT No.: PCT/GB2006/000674
§ 371 (c)(1),
(2), (4) Date: Aug. 16, 2007

(87) PCT Pub. No.: WO2006/097676
PCT Pub. Date: Sep. 21, 2006

(65) Prior Publication Data
US 2008/0249817 A1    Oct. 9, 2008

(30) Foreign Application Priority Data

Mar. 16, 2005 (EP) .................................. 05251582
Mar. 16, 2005 (EP) .................................. 05251583

(51) Int. Cl.
*G06F 15/18* (2006.01)
*G06Q 10/00* (2006.01)

(52) U.S. Cl. ........................................................ 706/52
(58) Field of Classification Search .................... 706/52; 348/143, 150
See application file for complete search history.

(56) References Cited

U.S. PATENT DOCUMENTS

| 5,524,176 | A | 6/1996 | Narita et al. |
| 5,577,169 | A | 11/1996 | Prezioso |
| 5,721,903 | A | 2/1998 | Anand et al. |
| 5,724,488 | A | 3/1998 | Prezioso |
| 5,819,033 | A | 10/1998 | Caccavale et al. |
| 6,078,911 | A * | 6/2000 | Bonissone et al. .............. 706/52 |
| 6,078,924 | A | 6/2000 | Ainsbury et al. |
| 6,236,978 | B1 | 5/2001 | Tuzhilin |
| 6,760,684 | B1 | 7/2004 | Yang et al. |
| 6,839,680 | B1 | 1/2005 | Liu et al. |
| 6,871,186 | B1 | 3/2005 | Tuzhili et al. |

(Continued)

FOREIGN PATENT DOCUMENTS

DE    19537010 A1    4/1997

(Continued)

OTHER PUBLICATIONS

EPO Search report for corresponding EP App. 05252068.1-2218, Jun. 22, 2005.

(Continued)

*Primary Examiner* — Donald Sparks
*Assistant Examiner* — Ola Olude-Afolabi
(74) *Attorney, Agent, or Firm* — Nixon & Vanderhye P.C.

(57) ABSTRACT

The performance of a computer-controlled system (1) operating under the control of a first process (2), is monitored (4) by comparison (5) with a predetermined set of requirements (15, 25), to identify whether the performance of the system (1) meets the predetermined requirements. If the performance does not meet those requirements, an alternative program (22) may be selected, or generated from program elements stored in a library (60), to replace the current controller process (2).

25 Claims, 4 Drawing Sheets

U.S. PATENT DOCUMENTS

| | | | |
|---|---|---|---|
| 7,272,586 | B2 | 9/2007 | Nauck et al. |
| 7,743,078 | B2 | 6/2010 | Azvine et al. |
| 2003/0037063 | A1 | 2/2003 | Schwartz |
| 2004/0158567 | A1 | 8/2004 | Dettinger et al. |
| 2005/0055369 | A1 | 3/2005 | Gorelik et al. |
| 2005/0060332 | A1 | 3/2005 | Bernstein et al. |

FOREIGN PATENT DOCUMENTS

| | | |
|---|---|---|
| DE | 19914277 A1 | 10/2000 |
| EP | 0 681 249 A2 | 11/1995 |
| EP | 1 081 622 A2 | 7/2001 |
| WO | WO 95/02855 | 1/1995 |
| WO | WO 96/14608 | 5/1996 |
| WO | WO 02/077879 A1 | 10/2002 |
| WO | WO 03/003811 A1 | 1/2003 |

OTHER PUBLICATIONS

PCT International Search Report for parent PCT/GB2006/001022, Jun. 23, 2006.
Elomaa et al., "General and Efficient Multisplitting of Numerical Attributes," Machine Learning, vol. 36, pp. 201-244, 1999, XP009048584.
Elomaa et al., "Efficient Multisplitting Revisited: *Optima-Preserving Elimination of Partition Candidates*," Data Mining and Knowledge Discovery, pp. 97-126, 2004, XP002330976.
Zeidler J. et al., "Fuzzy Decision Trees and Numerical Attributes," Fuzzy Systems, 1996, Proceedings of the Fifth IEEE International Conference on New Orleans, LA, USA, New York, NY, USA, IEEE, U.S. vol. 2, Sep. 8, 1996, XP010195828.
Peng Y. et al., "Soft Discretization to Enhance the Continuous Decision Tree Induction," Integrating Aspects of Data Mining, Decision Support and Meta-Learning, ECML PKDD Workshop Notes, pp. 1-11, Sep. 2001XP002330977.
Zadeh, L.A., "Fuzzy Sets," Inform. Control, vol. 8, pp. 338-353, 1965.
Nauck et al., "Foundations of Neuro-Fuzzy Systems," Wiley Chichester, 1997 (Abstract of book provided; see relevance, p. 2 of specification).
Fayyad et al., "On the Handling of Continuous-Valued Attributes in Decision Tree Generation," Machine Learning, vol. 8, pp. 87-102, 1992.
Elomaa et al. "Finding Optimal Multi-Splits for Numerical Attributes in Decision Tree Learning," NeuroCOLT Technical Report Series NC-TR-96-041, Department of Computer Science, Royal Holloway University of London, 1996.
Kuncheva, L., "How good are fuzzy if-then classifiers?," IEEE Transactions on Systems, Man, and Cybernetics, Part B: 30, pp. 501-509, 2000.
Gal, A. et al, "A Framework for Modeling and Evaluating Automatic Semantic Reconciliation," VLDB Journal (2005), vol. 14, No. 1, Dec. 19, 2003, pp. 50-67.
Gal, A. et al, "Automatic Ontology Matching using Application Semantics," published on the Internet, Online! 2003, pp. 1-16, XP002339557; http://iew3.technion.ac.il/OntoBuilder/Data/10. OntoBuilder_Papers/dis.pdf; also published in AI Magazine, Spring 2005, vol. 26, Issue 1, pp. 21-31, American Association for Artificial Intelligence, Menlo Park, CA, USA.
Rahm E. et al, "A Survey of Approaches to Automatic Schema Matching," VLDB Journal, vol. 10, No. 4 (Dec. 2001), pp. 334-350, XP002263938; Published online: Nov. 21, 2001, Springer Verlag, Berlin, DE.
Ying Ding et al, "Ontology Research and Development: Part 2—A Review of Ontology mapping and evolving," Journal of Information Science, North-Holland, Amsterdam, NL, vol. 28, No. 5, 2002, pp. 375-388.
European Search Report dated Aug. 17, 2005 in EP 05251932 and EPO Communication dated Aug. 26, 2005 in EP 05251932.9 transmitting the European search report.
International Search Report dated May 17, 2006 in PCT/GB2006/001050.
Elfeky M. G. et al, "TAILOR: A Record Linkage Toolbox," Proceedings of the 18th International Conference on Data Engineering (ICDE 2002), San Jose, CA, IEEE Computer Society.
Proceedings of IJCAI-03 Workshop on Information Integration on the Web (IIWeb-03), Aug. 9-10, 2003, Acapulco, Mexico.
Newcombe, H. B. et al, "Automatic Linkage of Vital Records," Science, 1959, vol. 130, pp. 954-959.
Fellegi, I. P. et al, "A theory for Record Linkage," J. American Statistical Assoc., 1969, vol. 64, No. 328, pp. 1183-1210.
Dey, D. et al., "A Distance-Based Approach to Entity Reconciliation in Heterogeneous Databases," IEEE Transactions on Knowledge and Data Engineering, 2002, 14(3), pp. 567-582.
Bilenko, M. et al., "Adaptive Name Matching in Information Integration," IEEE Intelligent Systems, 2003, 18, pp. 16-23.
Madhavan, J. et al., "Generic Schema Matching with Cupid," Proceedings of the 27th International Conference on Very Large Data Bases, Rome, Italy, 2001, pp. 49-58.
Doan, A. et al., "Learning to Match the Schemas of Data Sources: A Multistrategy Approach," Machine Learning, 2003, 50(3), pp. 279-301.
Modica, G. et al., "The Use of Machine-Generated Ontologies in Dynamic Information Seeking," Lecture Notes in Computer Science, 2001 (2172), pp. 433-448.
Noy, N. F. et al., "The PROMPT suite: interactive tools for ontology merging and mapping," Stanford Medical Informatics, Stanford University, Aug. 5, 2003, http://smi.stanford.edu/smi-web/reports/SMI-2003-0973.pdf.
Berlin, J. et al., "Autoplex: Automated Discovery of Content for Virtual Databases," Lecture notes in Computer Science, 2001 (2172), pp. 108-122.
Gal, A. et al., "A Model for Schema Integration in Heterogeneous Databases," Proceedings of the Seventh International Database Engineering and Applications Symposium (IDEAS '03), 2003, Hong Kong, IEEE Press.
Smith C. U. et al, "Software Performance Engineering: A Case Study Including Performance Comparison With Design Alternatives," IEEE Transactions on Software Engineering, IEEE Inc., New York, US, vol. 19, No. 7, Jul. 1, 1993, pp. 720-741; XP000413274.
Smith C. U. et al., "Performance Engineering Evaluation of Object-Oriented Systems with SPE*ED," Internet, Dec. 31, 1997, pp. 1-21, XP002349373, http://www.perfeng.com/papers/tools97.pdf.
Steigner C. et al., "Performance Tuning of Distributed Applications with CoSMoS," Proceedings 21st International Conference on Distributed Computing Systems Apr. 16-19, 2001, Mesa, AZ, USA, Apr. 19, 2001, pp. 173-180, XP002349374.
International Search Report dated Jan. 4, 2007 in International Application No. PCT/GB2006/000674.
European Search Report dated Oct. 17, 2005 in Application No. EP 05 25 1582.
European Search Report dated Oct. 17, 2005 in Application No. EP 05 25 1583.
Liggesmeyer, "Selecting Engineering Techniques using Fuzzy Logic Based Decision Support", Engineering of Computer-Based Systems, 1996. Proceedings., IEEE Symposium and Workshop on Friedrichshafen, Germany, Mar. 11-15, 1996, Los Alamitos, CA, USA, IEEE Comput. Soc., US, Mar. 11, 1996, pp. 427-434, XP010159694.
Lelescu et al., "Approximate Retrieval From Multimedia Databases Using Relevance Feedback", String Processing and Information Retrieval Symposium, 1999 and International Workshop on Groupware Cancun, Mexico Sep. 22-24, 1999, Los Alamitos, CA, USA, IEEE Comput. Soc., US, Sep. 22, 1999, pp. 215-223, XP010353490.
Medasani et al., "A Fuzzy Approach to Content-based Image Retrieval", Fuzzy Systems Conference Proceedings, 1999, FUZZ-IEEE '99, 1999 IEEE International Seoul, South Korea Aug. 22-25, 1999, Piscataway, NJ, USA, IEEE, US, Aug. 22, 1999, pp. 1251-1260, XP010350791.
Frigui, "Adaptive Image Retrieval Using the Fuzzy Integral", North American Fuzzy Information, 1999, Piscataway, NJ, USA, IEEE, US, Jun. 10, 1999, pp. 575-579, XP010342957.

Nauck et al., "Obtaining Interpretable Fuzzy Classification Rules from Medical Data", Artificial Intelligence in Medicine, Jun. 1999, Elsevier, Netherlands, vol. 16, No. 2, pp. 149-169, XP002209444.

Nauck et al., "Neuro-Fuzzy Systems for Function Approximation", Fuzzy Sets and Systems, North-Holland, Amsterdam, NL., vol. 101, No. 2, Jan. 16, 1999, pp. 261-271, XP004158428.

Kors et al., Induction of Decision Rules that Fulfil User-Specified Performance Requirements Pattern Recognition Letters, North-Holland Publ. Amsterdam, NL., vol. 18, No. 11-13, Nov. 1, 1997, pp. 1187-1195, XP004117917.

Dickerson et al, "Fuzzy Network Profiling for Intrusion Detection", IEEE NAFIPS, Jul. 2000.

European Search Report dated Aug. 9, 2002 from EP 01308260.

European Search Report dated Jul. 11, 2002 from EP 01308280.

European Search Report dated May 21, 2002 from EP 01308261.

International Search Report dated Jul. 8, 2004 from PCT/GB 02/04328.

* cited by examiner

MONITORING COMPUTER-CONTROLLED PROCESSES THROUGH A MONITORING SYSTEM

This application is the US national phase of international application PCT/GB2006/000674 filed 27 Feb. 2006 which designated the U.S. and claims benefit of EP 05251582.2 and EP 05251583.0, dated 16 Mar. 2005 and 16 Mar. 2005, respectively, the entire content of which is hereby incorporated by reference.

This application is also related to, commonly assigned and filed U.S. patent application Ser. No. 11/886,737 filed Sep. 20, 2007, Ser. No. 11/887,401 filed Sep. 28, 2007, and Ser. No. 10/488,782, now U.S. Pat. No. 7,272,586 issued Sep. 18, 2007.

BACKGROUND

1. Technical Field

This invention relates to monitoring computer-controlled processes.

2. Description of Related Art

Many processes are controlled by computers. Examples range from technical processes like manufacturing, engine management, etc, through information technology applications such as air traffic control, to business processes such as work scheduling or customer call centre management. Such processes are designed around predetermined assumptions about the environment in which the process is to operate. Should that environment be changed, those assumptions may no longer be valid, and the controlling software may have to be adapted or replaced in order to maintain a required quality of operation. Moreover, whenever the process itself changes, the system that it controls also needs to be adapted to the new requirements. In both cases, it is quite often sufficient to change the process data that controls the system, rather than change the entire system. The process data is typically embodied in software for controlling a computer, the process software itself being installed either as a physical component carrying the necessary programme data, such as a plug-in module or a carrier such as a CD-ROM, or in the form of a signal carried over a communications network.

In currently available systems, changing the process data requires human intervention. New requirements have to be identified, the process data has to be redesigned according to those requirements, and then implemented, tested and finally installed into the system.

Consider a call centre, from which customers are to be contacted in order to offer them new services, or to follow up previous contact with the customers. Typically the process that selects the customers to be contacted is implemented as a piece of software. Amongst many others, typical categories of requirements for such a process are levels of simplicity, adaptability, accuracy and execution time.

More specifically, requirements may include the use of a rule-based process, so that the process manager can understand the selection process that determines which customers are to be contacted. Rule-based processes may be necessary in order to ensure compliance with the rules laid down by regulatory bodies. The number of rules may be constrained in order to keep the process comprehensible.

Another requirement may be adaptability to new data, so that the process can be adapted as new customer or process data becomes available. In particular, time or data storage constraints may make it impossible to use all historic data when recalculating trends and other statistical data.

Another common requirement is a specified level of accuracy; given historic information the process should aim to only contact customers who are in the target group.

The user may have requirements for other parameters, for example for execution time.

All these constraints are to some extent in conflict, for example accuracy may only be improved by incurring a speed penalty.

Similar considerations apply in other contexts: for example, in an engine management system improved dynamic performance will usually incur a detriment in fuel economy and engine life. There may be rules that have to be applied, for example on engine emissions. In traffic management applications (air, road, rail etc), additional throughput may be obtained only at the expense of speed, punctuality, risk factors etc.

The user of a prior art system will select an appropriate process for the required purpose, in accordance with such requirements. The main objective of picking the right process is finding the right balance, i.e. optimising the match of requirements with properties.

Systems exist that can select a process optimised to a given set of requirements. An example is disclosed in International Patent Application WO03/027899, which discloses a method of selecting a data analysis method in accordance with a user preference, wherein the user preference relates to a feature of the data analysis method and is represented by a fuzzy set comprising a range of values, the method comprising the steps of (i) using the user preference to identify one or more rules corresponding to the user preference, each rule comprising at least one fuzzy set that relates features of data analysis methods to data analysis characteristics;

(ii) evaluating the or each identified rule, thereby identifying an instance of a data analysis characteristic associated with the identified rule, the instance comprising a fuzzy set having a range of values;

(iii) retrieving data identifying a plurality of data analysis methods, each of which has a plurality of data analysis characteristics, wherein, in respect of each said data analysis characteristic, the retrieved data includes a range of values; and (iv) comparing the retrieved data with the data analysis characteristic instance in order to identify a data analysis method that matches the user preference.

However, such a system is not suited to situations in which the environment is changing continuously and unpredictably. In customer relations management systems, for instance, customer behaviour, and consequently the data relating to those customers, may respond to changes in the respective market. A process like the one discussed above needs to adapt continuously to such changes, or may even need to be replaced. In additional, mechanical systems such as engines may suffer physical deterioration, or changes in their environment, requiring an update of the controlling process to accommodate these changed characteristics.

Adapting control systems to changing requirements or environments has in the past been tackled in one of three ways. Firstly, a manual redesign of the control software may be performed and installed. Secondly, if the range of possible requirements and environmental changes is known beforehand, a set of possible solutions may be provided in advance, with the user selecting the most appropriate for the present situation. Thirdly, a parameterised process may be used, wherein the parameters adapt to measured changes.

The first approach requires manual intervention resulting in high costs and the risk of introducing new faults. The range of applications to the second approach is heavily restricted since the range of possible changes must be known beforehand. This second approach is not feasible if there are a large variety of possible changes, since it requires a great number of possible solutions to be prepared. The third approach is also impractical unless the variety of different requirements or changes can be predicted well enough to ensure the measured parameters are indicative of the actual changes encountered in the environment.

BRIEF SUMMARY OF EXAMPLE EMBODIMENTS OF THE PRESENT INVENTION

According to the present invention there is provided apparatus for operating a computer-controlled system, comprising means for monitoring the performance of the system when operating under the control of a first process, and monitoring means for comparing the monitored performance to a set of predetermined requirements, and for identifying when such performance fails to meet the predetermined requirements.

The invention also extends to a method of operating a computer-controlled system, the method comprising the steps of monitoring the performance of a system operating under the control of a first process, comparing the performance to a predetermined set of requirements, and identifying whether the performance of the system meets the predetermined requirements.

By monitoring the actual performance, rather than the properties that influence it, a more direct measure of the need for, and effect of, changes can be determined.

The invention allows the automatic creation and installation of a new process according to information derived from monitoring system performance and user requirements, using a knowledge base and an automatic data analysis system.

The requirements for the process may relate both to requirements of the user and properties of the system. The selection criteria may be based on a number of characteristics such as simplicity, adaptability, accuracy and execution time. In a preferred embodiment these have so-called "fuzzy" properties—they do not have simple binary "on/off" characteristics but are defined by a range of values, and the process to be selected is identified using a fuzzy matching procedure.

A preferred embodiment uses the same matching procedure to also control the selection of a process to operate a computer-controlled system, the apparatus comprising means for reading data relating to predetermined requirements for the process, means to generate process data, comparison means to compare the generated data with the process requirements, to identify characteristics meeting the predetermined requirements, and selection means to generate process data from the data so identified for installation in the computer-controlled system. The process data may be in the form of executable programs, but is preferably a set of templates for process elements, that may be combined to form an executable program for installation in the system. The invention also extends to a method of operating a computer-controlled system to generate process data to control the system wherein a set of process requirements are defined, and stored process data is compared with data relating to the defined requirements, to identify process data that matches the said requirements, and generate a process in accordance with said data for installation in the system. The automated generation of candidate processes, and the selection from such candidates, avoids the problems of manual intervention and limitations on possible changes of requirements or the environment.

The invention also extends to a computer program or suite of computer programs for use with one or more computers to carry out the method, or to provide any of the apparatus, of the invention.

BRIEF DESCRIPTION OF THE DRAWINGS

An embodiment of the invention will now be described by way of example, with reference to the drawings, in which.

DETAILED DESCRIPTION OF EXAMPLE EMBODIMENTS OF THE PRESENT INVENTION

As will be understood by those skilled in the art, any or all of the software used to implement the invention can be contained on various transmission and/or storage mediums such as a floppy disc, CD-ROM, or magnetic tape so that the program can be loaded onto one or more general purpose computers or downloaded over a computer network using a suitable transmission medium. The program may be embodied on any suitable carrier readable by a suitable computer input device, such as CD-ROM, optically readable marks, magnetic media, punched card or tape, or on an electromagnetic or optical signal.

Figure 1:
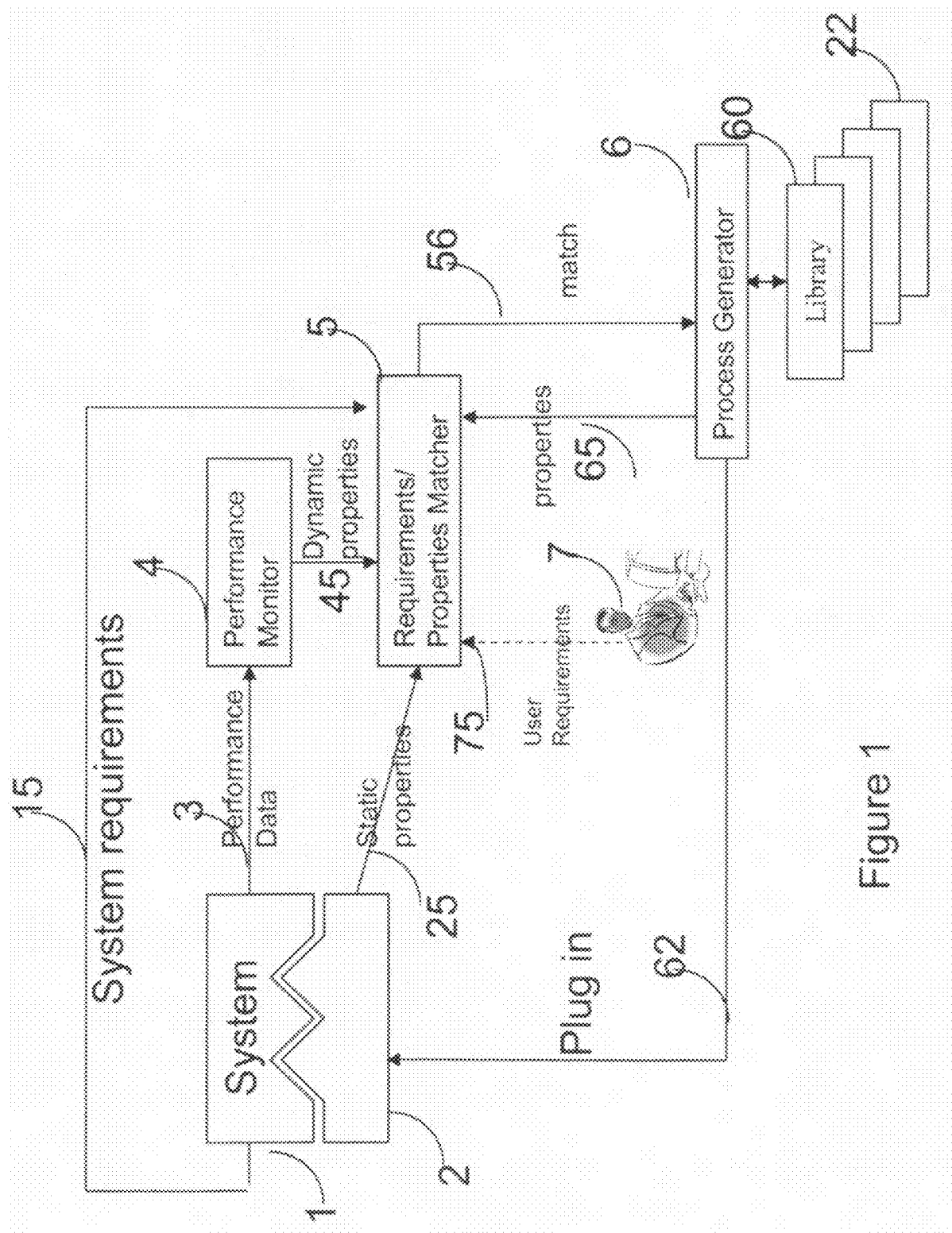
FIG. 1 is a schematic representation of a system incorporating the present invention

FIG. 1 depicts a system 1 which implements or supports a process in response to a process 2. The process 2 can be implemented in a hardware module, like an FPGA-based system or a programmable signal processor, or as a software module on a computer. The process 2 operates according to a program and a set of parameters. The system generates data 3 that can be used to measure the performance of the system. For example, the system 1 might be used to manage CRM processes, in which the process 2 generates measurements of factors such as customer satisfaction, product sales or any other related measure like costs of calling the customers. In other systems, for example engine management, the output 3 would return data on performance. In traffic management systems, the output 3 may include measures of vehicle speeds, queue lengths, etc.

A performance monitor 4 has access to the performance data 3 generated by the system 1, in order to measure its performance. Actual performance measures can be defined by the user 7 to be stored in the performance monitor 4. The performance of the system 1 indirectly acts as an indicator of the performance of the process embodied in the module 2, since that process is built to positively influence the operation of the system 1. For this reason, the performance of the system 1 can be interpreted as a property of the process module 2. The performance is dynamic in the sense that it not only depends on the process 2 but also on the system 1 and its environment.

For example, if the performance of a CRM system is measured in terms of customer satisfaction, the performance depends not only on the process that tries to pick the most unsatisfied customers, but also on the environment of the market. Influences might not be directly captured by the system but only indirectly observable. For example, they could include a documentary on TV that changes the perception of customer satisfaction of a certain customer segment. Similarly, the performance of an engine management system would depend to some extent on indirectly observable external factors such as the laden weight of the vehicle, condition of tyres, and ambient conditions such as temperature. Such situations may cause the performance to drop, necessitating updating or replacement of the process 2 to reflect those changes. The actual causes of such changes in performance may not be identified: however, the actual change in performance is itself indicative that the process currently in use may no longer be the most suitable for the purpose.

One performance indicator is execution time, which depends on the amount of data the process has to deal with. If the amount of data to be processed increases, so usually does the execution time of the process 2. If execution time begins to exceed user requirements 75, (for example, if real-time capabilities are lost), the process 2 may need to be replaced with a simpler one.

As shown in FIG. 1, the performance monitor 4 receives data from the system 3, and uses that data to determine the performance of the system. The performance values 45 generated are then submitted to the requirements/properties matching system 5 as dynamic properties of the process.

The Requirements/Properties Matching system 5 determines the degree to which the requirements 15, 75 for the process 2 match its actual properties 25, 45. Some of the properties of the process 2 are "dynamic": these are the performance indicators 45 received from the performance monitor 4, and other properties influenced by the system, the process, or their environment. There are also "static" properties 25: these are permanent properties of the process 2 that do not change after it has been implemented in the system 1 and include interpretability, simplicity, adaptability and computational complexity.

The requirements 15 of the system 1, such as the operating speed, operating system, available memory capacity and so on are fed to the matching system 5. These properties are generally fixed, but may change if the system is upgraded or as a result of usage over time. For example if a database forming part of the system is continually being added to, programs suited to operating only on small databases may become less efficient. The available memory may also be used up as more data is stored. Deterioration of a physical system 1 such as an engine controlled by the process 2 (e.g. an engine management system) may also introduce a dynamic element to the system requirements 15.

The user's requirements 75 are captured by the matching system 5 in a graphical user interface (GUI) using natural language terms. A user might, for instance, require a 'very simple' algorithm with 'low execution time' that is 'highly adaptable' to new data and at least of 'medium accuracy'.

The matching system 5 contains a fuzzy rule-base that maps the requirements 15, 75 onto properties 25 of the process currently in use and a given list 65 of process templates stored in a database 6 to identify the closest match 56.

The matching system 5 is used for two different tasks. Firstly, the current process 2 controlling the system 1 is monitored, by means of the performance monitor 4. If the performance monitor 4 reports a notable drop in performance it reports this 45 to the matching system 5, indicating that it may be appropriate to update or replace the process 2. The matching system 5 is used to determine whether the performance still falls within acceptable limits, as determined by comparison with the user requirements 75 and system requirements 45.

Should the performance now be outside those limits, the second task of the matching system 5 is to evaluate a number of available process templates stored in the library 60 regarding their suitability for the task. This is done by mapping user and system requirements 75, 45 onto the properties 65 of the candidate processes. The match-making in this process is constrained to those properties 25, 65 that are known before a process has actually been implemented, such as adaptability, explanation facility or computational complexity. They do not include any dynamic properties, or static ones like simplicity or interpretability that can only be measured when a process 2 has been created. The matching system 5 produces a ranking of process templates and triggers an implementation of the best one in the software library 60.

Figure 2:
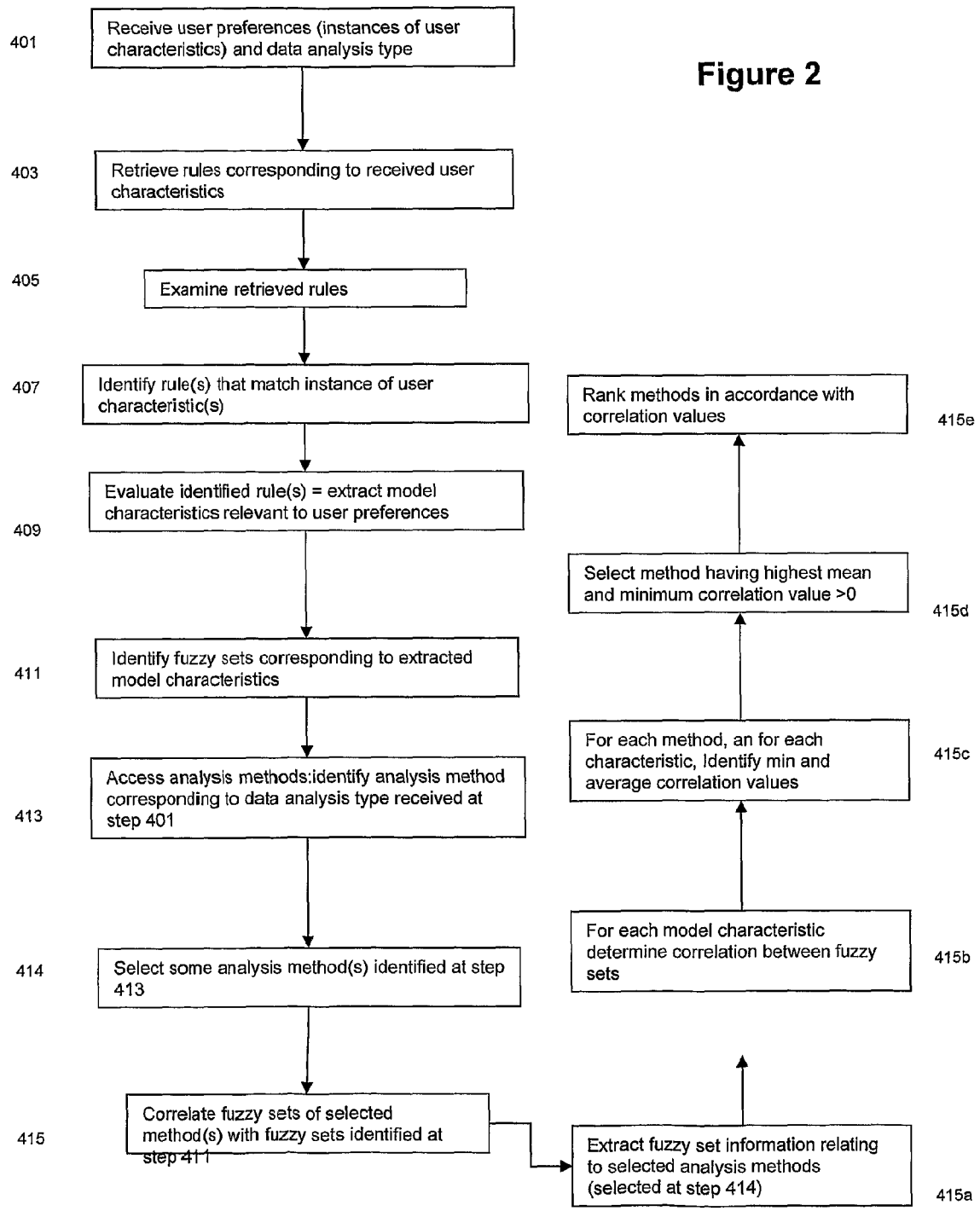
FIG. 2 is a flow diagram illustrating the operation of the matcher unit of the system shown in FIG. 1

Matching requirements to properties involves the following steps, as shown in FIG. 2, and described in detail in the applicant's earlier International Patent application WO03/027899:

Firstly, the given requirements are matched with antecedents of fuzzy rules (steps 401-407)

Next, the required process properties are determined as an aggregation of conclusions of fuzzy rules (steps 409-414)

Finally, the required process properties are matched with actual process properties (steps 415-415*e*)

In more detail, referring to FIG. 2, the matching operation 5 receives, via the user interface 75, user preferences (step 401), along with data from the performance monitor 4 and process 2. The matching process then retrieves (step 403) rules corresponding to these characteristics. The matching system 5 then examines (step 405) a library of rules, and identifies (step 407) one or more rules that match the input characteristics 25, 45, 75.

Having identified one or more rules corresponding to input characteristics, the matching system 5 evaluates (step 409) the identified rules. This identifies an instance of, or fuzzy sets corresponding to, one or more model characteristics. The matching system 5 thus identifies (step 411) as many fuzzy membership sets as the number of model characteristics extracted at step 409. The matching system 5 then accesses (step 413) entries corresponding to at least some analysis methods and identifies (step 414) methods corresponding to the type of data analysis specified as user preferences at step 401.

From the methods selected at step 414, the matching system 5 then identifies (step 415) those that have fuzzy membership corresponding to the fuzzy sets identified at step 411. When there are multiple inputs, this step 415 involves correlating fuzzy sets of the methods accessed at step 413 with fuzzy sets identified at step 411.

The matching system 5 then determines (step 415*b*) the correlation between the characteristics to be matched and the fuzzy sets corresponding to each of the method types. Next the matching system 5 identifies (step 415*c*) minimum and average correlation values for each of the methods, and selects (step 415*d*) whichever method has both the highest mean, and a minimum correlation greater than 0. In addition, the matching system 5 can rank (step 415*e*) the methods in accordance with the mean and minimum correlation values.

Figure 3:
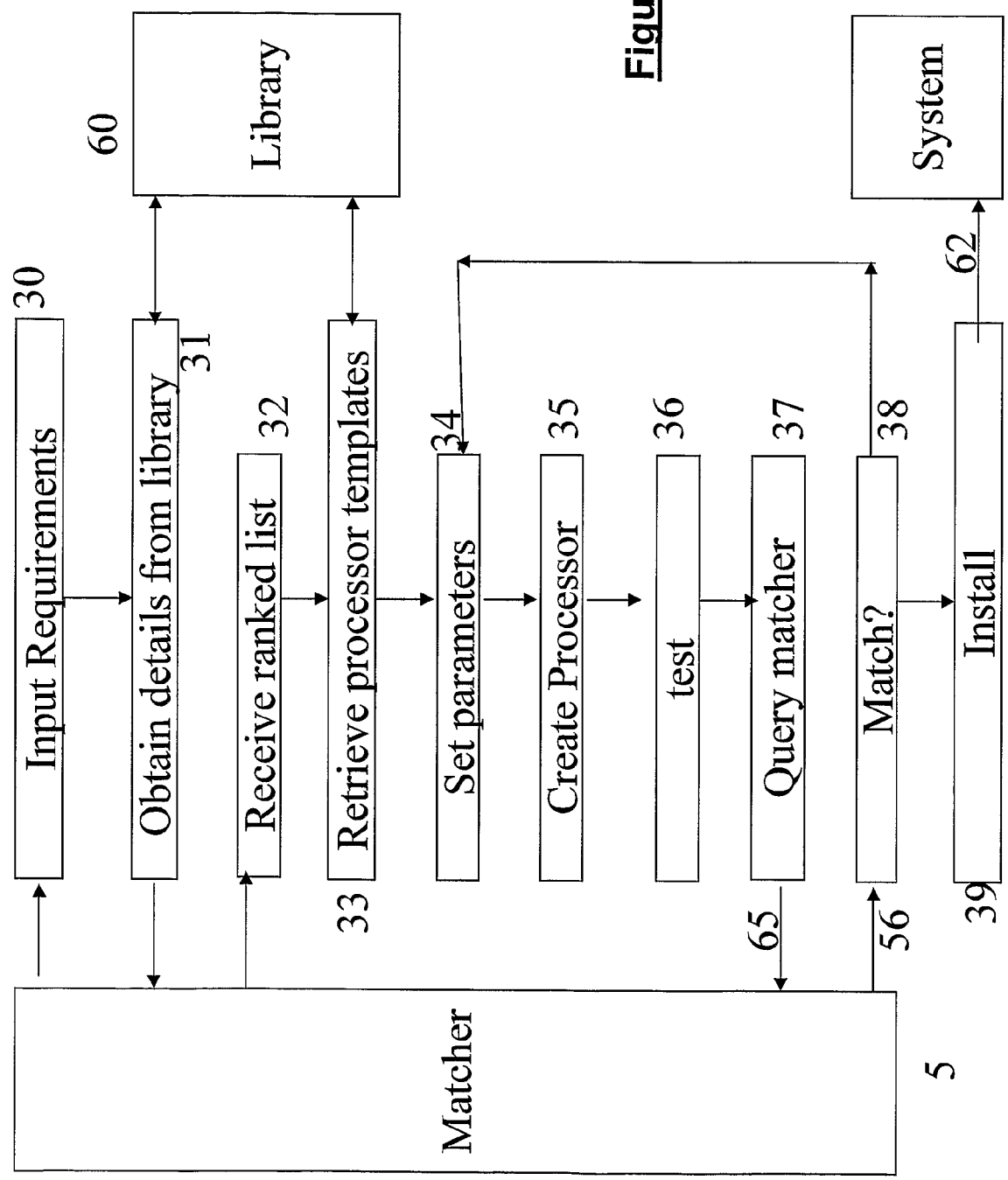
FIG. 3 is a flow diagram illustrating the operation of the process generator component of the system shown in FIG. 1

The Process Generator 6 is associated with a library 60 of process templates, each of which is associated with a set of data relating to its properties. The process generator 6 can retrieve an existing process program 22 from the library 60, or generate new ones from the templates, and has an output 62 to the system 1 allowing the delivery of a process 22 with a standard interface (API) that can be installed into the system 1 to replace the existing process 2 should the property matching system 5 identify the new process 22 as more closely matching the current requirements 15, 25, 45, 75 than the existing process 2. In order to achieve this the process generator operates as follows, as shown in FIG. 3:

step 30. Receive the requirements from the requirements/properties matching system 5 step 31. Retrieve details 65 of the properties of the available processes from the library 60, and deliver them to the matching system 5.

step 32. Receive from the matching system 5 a list 56 of the best-ranked processes based on these requirements. At this stage, only a subset of the static properties are taken into account.

step 33. Retrieve process templates from the library 60 step 34. Set parameters of templates aiming at a high degree of requirements/properties match. This process uses a fuzzy knowledge base that contains expert knowledge about setting parameters.

step 35. Create required process 22 from selected templates step 36. Test process 22 and determine test performance step 37. Query requirements/properties matching system 5 for degree of match step 38. If degrees of match are not satisfactory, the process resumes by re-setting the parameters of the templates (return to step 34)

step 39. If the degree of match is satisfactory, select the process 22 with the highest degree of match and generate a pluggable program module incorporating the process for installation in the system 1

How a new process 2 is installed in the system 1 depends on the type of process to be installed. In case of pure software processes, it is normally sufficient to copy a software library 22 as a file (e.g. dll or jar) onto the system. In case of hardware based processes like a FPGA or programmable DSP a program will be written onto a device, which then physically replaces the old one in the system 1 to be controlled. Building the final process involves combining the selected templates and configuring it by setting parameters. For example, in case of data analysis problems, the actual build process requires learning from historic data. Parameters are set in the template that might either influence the learning procedure or directly configure the final process, and the learning process would configure the final process.

Figure 4:
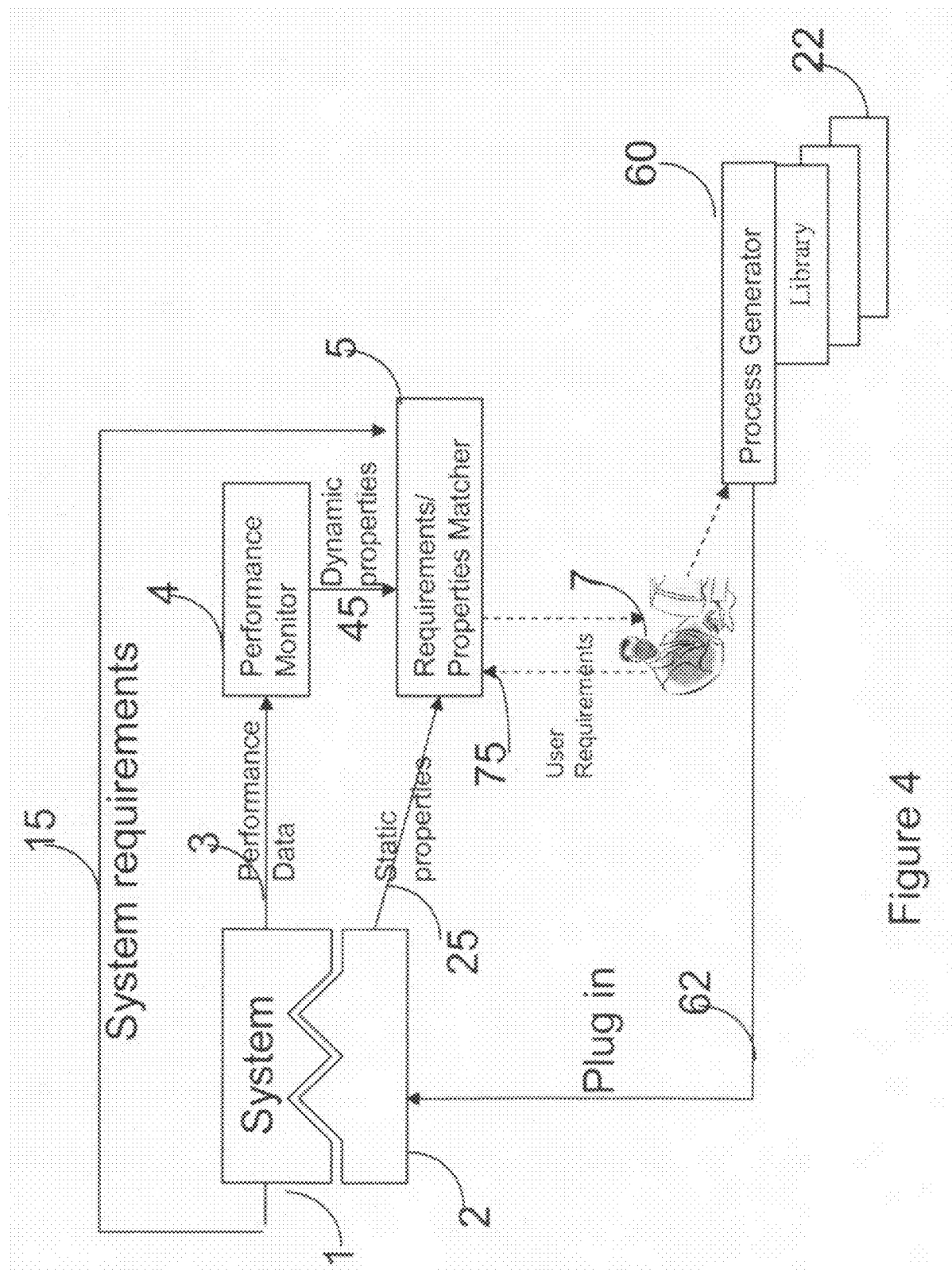
FIG. 4 is a schematic representation of another system operating in accordance with the present invention.

In the alternative embodiment according to FIG. 4 the process generator 6 is omitted. When the matching system 5 identifies the output of the performance monitor 4 as not matching the user and system requirements, it delivers an output 57 over the graphical user interface 75 previously discussed, identifying what characteristics would be desirable in a more suitable control program. The user 7, guided by the output 57, may then manually install a suitable control program 22 selected from a library 60 of programs exhibiting such characteristics.

The invention claimed is:

1. An apparatus for operating a computer-controlled system, the apparatus comprising:
   a performance monitor configured to monitor performance of the system when operating under the control of a first process;
   a monitoring system configured to compare the monitored performance to a set of predetermined requirements, and to identify when such performance fails to meet the predetermined requirements; and
   a process generator configured to generate, responsive to the monitoring system, a second process from a store of process data and to install the second process to control the computer-controlled system in place of the first process.

2. The apparatus according to claim 1, wherein the predetermined requirements relate to requirements of the user and properties of the computer-controlled system.

3. The apparatus according to claim 1, wherein the predetermined requirements are represented by fuzzy sets each comprising a range of values, and the process generator operates according to a fuzzy matching process.

4. The apparatus according to claim 1, the apparatus comprising a reader configured to read data relating to predetermined requirements for the process, a generator configured to generate process data, a comparator configured to compare the generated data with the process requirements, thereby identifying characteristics meeting the predetermined requirements, and a selector configured to generate process data from the data so identified for installation in the computer-controlled system.

5. The apparatus according to claim 1, wherein the process data is a set of templates for process elements, that may be combined to form an executable process program for installation in the computer-controlled system.

6. The apparatus according to claim 1 wherein the process generator is configured to extract one or more stored process templates, to compare the templates with the user and system requirements to identify templates meeting the user and system requirements, and to generate a process from the templates so identified, for installation in the computer-controlled system.

7. A method of operating a computer-controlled system, the method comprising:
   monitoring, using a computer system having one or more computers, the performance of a system operating under the control of a first process;
   comparing the performance to a predetermined set of requirements; and
   identifying whether the performance of the system meets the predetermined requirements;
   wherein in the event of the performance of the computer-controlled system failing to meet the predetermined requirements, a second process is generated better suited to the user requirements and current system operating parameters, and the second process is installed in the computer-controlled system to control the computer-controlled system in place of the first process.

8. A method according to claim 7, wherein the predetermined requirements relate to requirements of the user and properties of the computer-controlled system.

9. A method according to claim 7, in which the requirements have fuzzy characteristics each defined by a range of values, and the comparing operates according to a fuzzy matching process.

10. The method according to claim 7, wherein a set of process requirements is defined, and stored process data is compared with data relating to the defined requirements, to identify process data that matches the said requirements, and a process is generated in accordance with said data for installation in the computer-controlled system.

11. The method according to claim 10, wherein the second process is generated from a set of templates for process elements, that are combined to form an executable program for installation in the computer-controlled system.

12. The method according to claim 7 wherein the process generation process comprises: selecting one or more process templates from a store of process templates, and comparing the templates with data relating to user requirements, and data relating to properties of the system that is to be controlled by the process, to identify a set of templates that matches the said requirements, and generating a process from the templates so identified.

13. The method according to claim 12, wherein the comparison process used in the selection process is also used for the monitoring process.

14. A non-transitory computer-readable medium storing a computer program or suite of computer programs which upon execution by a computer system having one or more computers performs a method of operating a computer-controlled system, the method comprising:
monitoring the performance of a system operating under the control of a first process;
comparing the performance to a predetermined set of requirements; and
identifying whether the performance of the system meets the predetermined requirements;
wherein in the event of the performance of the computer-controlled system failing to meet the predetermined requirements, a second process is generated better suited to the user requirements and current system operating parameters, and the second process is installed in the computer-controlled system to control the computer-controlled system in place of the first process.

15. The non-transitory computer-readable medium according to claim 14, wherein a set of process requirements is defined, and stored process data is compared with data relating to the defined requirements, to identify process data that matches the requirements, and a process is generated in accordance with said data for installation in the computer-controlled system.

16. The non-transitory computer-readable medium according to claim 15, wherein the second process is generated from a set of templates for process elements, that are combined to form an executable program for installation in the computer-controlled system.

17. The non-transitory computer-readable medium according to claim 14 wherein the process generation process comprises: selecting one or more process templates from a store of process templates, and comparing the templates with data relating to user requirements, and data relating to properties of the system that is to be controlled by the process, to identify a set of templates that matches the said requirements, and generating a process from the templates so identified.

18. The non-transitory computer-readable medium according to claim 17, wherein the comparison process used in the selection process is also used for the monitoring process.

19. The non-transitory computer-readable medium according to claim 14, wherein the predetermined requirements relate to requirements of the user and properties of the computer-controlled system.

20. The non-transitory computer-readable medium according to claim 14, in which the requirements have fuzzy characteristics each defined by a range of values, and the comparing operates according to a fuzzy matching process.

21. An apparatus comprising:
an input for receiving performance data from a computer-controlled system;
a computer processing system, having one or more computers, configured to:
monitor performance of the computer-controlled system when operating under the control of a first process;
compare the monitored performance to a set of predetermined requirements;
identify when such performance fails to meet the predetermined requirements; and
responsive to the identifying, generate a second process from a store of process data and to install the second process to control the computer-controlled system in place of the first process.

22. The apparatus according to claim 21, wherein the computer processing system is configured to:
read data relating to predetermined requirements for the process,
generate process data,
compare the generated data with the process requirements, thereby identifying characteristics meeting the predetermined requirements, and
generate process data from the data so identified for installation in the computer-controlled system.

23. The apparatus according to claim 21, wherein the process data is a set of templates for process elements, that may be combined to form an executable process program for installation in the computer-controlled system.

24. The apparatus according to claim 21 wherein the computer processing system is configured to:
extract one or more stored process templates,
compare the templates with the user and system requirements to identify templates meeting the user and system requirements, and
generate a process from the templates so identified, for installation in the computer-controlled system.

25. The apparatus according to claim 21, wherein the predetermined requirements are represented by fuzzy sets each comprising a range of values, and the computer processing system operates according to a fuzzy matching process.

* * * * *